United States Patent
Mishra et al.

(10) Patent No.: US 11,509,494 B2
(45) Date of Patent: Nov. 22, 2022

(54) PROTOCOL INDEPENDENT MULTICAST (PIM) DESIGNATED ROUTER (DR) ELECTION

(71) Applicant: Cisco Technology, Inc., San Jose, CA (US)

(72) Inventors: Mankamana Prasad Mishra, Dublin, CA (US); Ali Sajassi, San Ramon, CA (US); Samir Thoria, Saratoga, CA (US); Krishnaswamy Ananthamurthy, San Ramon, CA (US); Stig Ingvar Venaas, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 351 days.

(21) Appl. No.: 16/205,430

(22) Filed: Nov. 30, 2018

(65) Prior Publication Data
US 2020/0177402 A1 Jun. 4, 2020

(51) Int. Cl.
| | | |
|---|---|---|
| *H04L 45/16* | (2022.01) | |
| *H04L 67/2895* | (2022.01) | |
| *H04L 12/18* | (2006.01) | |
| *H04L 12/46* | (2006.01) | |

(52) U.S. Cl.
CPC ........ *H04L 12/185* (2013.01); *H04L 12/1886* (2013.01); *H04L 12/4679* (2013.01); *H04L 45/16* (2013.01); *H04L 67/2895* (2013.01)

(58) Field of Classification Search
CPC .................................................. H04L 12/1886
See application file for complete search history.

(56) References Cited

U.S. PATENT DOCUMENTS

| | | |
|---|---|---|
| 8,576,702 B2 | 11/2013 | Boddapati et al. |
| 9,071,546 B2 | 6/2015 | Cai et al. |
| 9,525,563 B2 | 12/2016 | Zhou et al. |
| 9,548,926 B2 | 1/2017 | Raman et al. |
| 9,992,099 B2 | 6/2018 | Cai et al. |
| 10,116,464 B2 | 10/2018 | Lin et al. |
| 2011/0305239 A1* | 12/2011 | Chandrashekharachar Suvarneshwar ...... H04L 12/185 370/390 |

(Continued)

OTHER PUBLICATIONS

Sajassi et al., "IGMP and MLD Proxy for EVPN," Internet Engineering Task Force (IETF) BESS Working Group, Internet-Draft, pp. 1-52, available at https://tools.ietf.org/html/draft-ietf-bess-evpn-igmp-mld-proxy-01.

*Primary Examiner* — Nicholas R Taylor
*Assistant Examiner* — Sm Z Islam
(74) *Attorney, Agent, or Firm* — Merchant & Gould P.C.

(57) ABSTRACT

In one embodiment, a method is performed. A device may include an interface in communication with a network. The device may determine whether an all-active multi-homed ethernet segment (ES) associated with the interface is enabled. On a condition that an all-active multi-homed ES is enabled, the device may determine an ethernet virtual private network (EVPN) designated forwarder (DF) state of the all-active multi-homed ES. If the all-active multi-homed ES is enabled and has an ethernet virtual private network (EVPN) designated forwarder (DF) state, the device may enter a protocol independent multicast (PIM) designated router (DR) state. If an all-active multi-homed ES is enabled and does not have an EVPN DF state, the device may enter a PIM non-DR state.

20 Claims, 8 Drawing Sheets

(56) References Cited

U.S. PATENT DOCUMENTS

| | | | |
|---|---|---|---|
| 2015/0249594 A1* | 9/2015 | Cai | H04L 45/7453 |
| | | | 370/390 |
| 2016/0119156 A1* | 4/2016 | Drake | H04L 12/4641 |
| | | | 709/223 |
| 2016/0191374 A1* | 6/2016 | Singh | H04L 45/24 |
| | | | 370/228 |
| 2017/0005816 A1 | 1/2017 | Chang et al. | |
| 2017/0195210 A1* | 7/2017 | Jacob | H04L 69/321 |
| 2019/0229937 A1* | 7/2019 | Nagarajan | H04L 12/1886 |

* cited by examiner

```
host
evpn_enabled_pim_dr (I) {
  if ( I has all active multi-homed segment enabled) {
    /*
     * presence of router can be achieved by looking at Query / PIM Hello on network
     * Orphan bridge port are ports in Bridge domain, where there is local Active receiver present
     */
    if (other PIM router present || orphan bridge port present (with membership request || Query)) {
      return (DR(I))
    } else if ( I has only multi-homed segment && at least one ES has EVPN of state) {
      dr = me
      return (dr)
    } else {
      return 0    /* 0 would mean no DR elected on I. And I would be in non DR state */
    }
  }
  /*
   * Default case, where there is no multi-homing enabled
   */
  return (DR(I))
}
where DR(I) is defined as ,
host
DR(I) {
  dr = me
  for each neighbor on interface I {
    if ( dr_is_better( neighbor, dr, I ) == TRUE ) {
      dr = neighbor
    }
  }
  return dr
}
```

PROTOCOL INDEPENDENT MULTICAST (PIM) DESIGNATED ROUTER (DR) ELECTION

TECHNICAL FIELD

The present disclosure generally relates to wired or wireless networking.

BACKGROUND

Ethernet virtual private networks (EVPNs) may provide ethernet multipoint services over multiprotocol label switching (MPLS) networks. EVPN multi-homing, in which a device may be connected to multiple networks, is gaining wider acceptance in service provider and data center deployments. EVPN technologies may support all-active multi-homing. Internet group management protocol (IGMP) proxy procedures may be incorporated on EVPN provider edge (PE) routers to efficiently support endpoints running IGMP for providing services over an EVPN network.

BRIEF DESCRIPTION OF THE DRAWINGS

For an understanding of aspects of various embodiments described herein and to show how they may be carried into effect, reference is made, by way of example only, to the accompanying drawings.

FIG. 4 is a diagram that illustrates example pseudocode for implementing the disclosed subject matter.

DESCRIPTION OF EXAMPLE EMBODIMENTS

Overview

Figure 1:
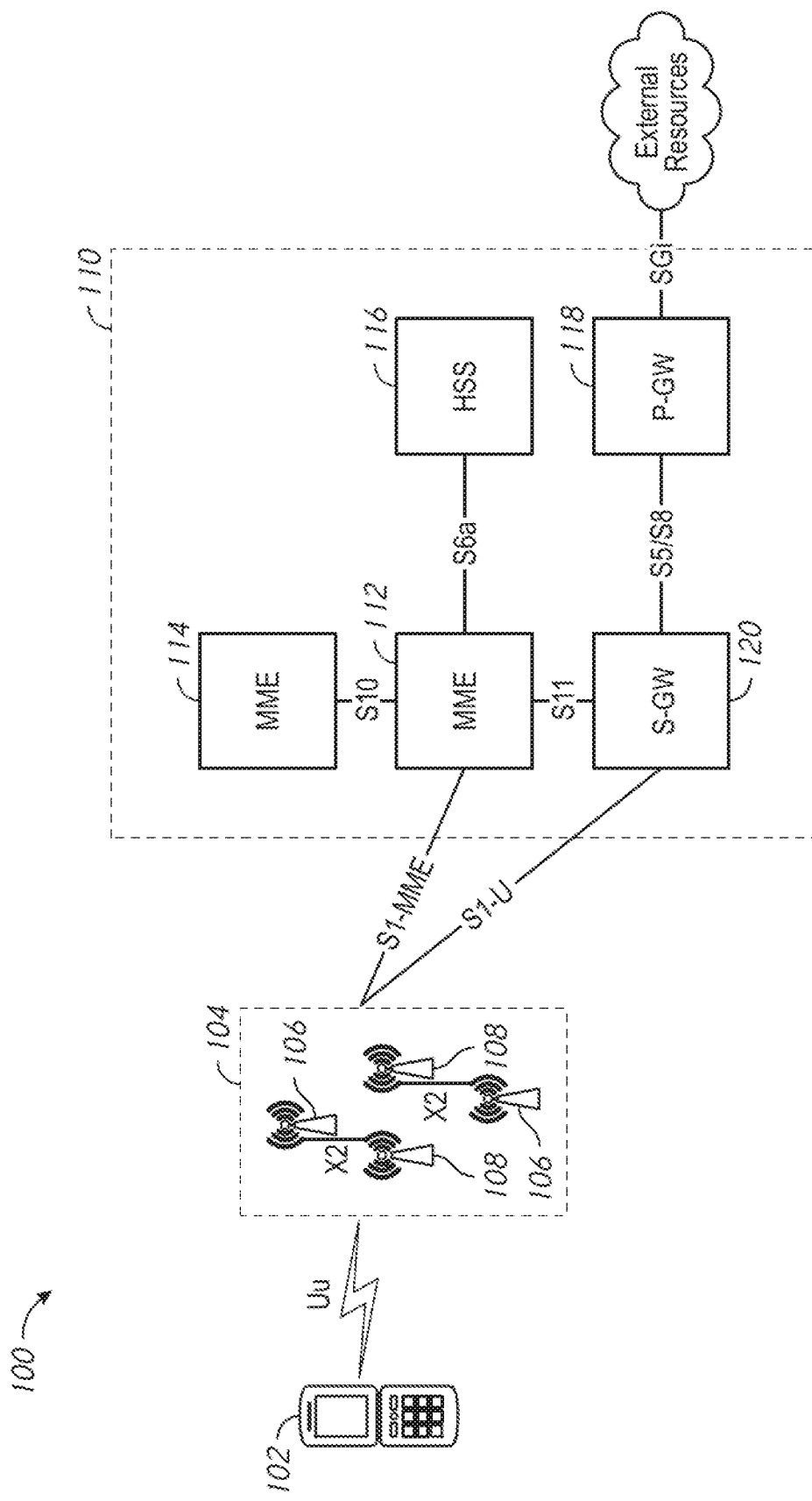
FIG. 1 is a diagram that illustrates an example network.

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein may include devices, systems, and methods for deciding which EVPN in a redundancy group should forward multicast traffic to access circuits (ACs) and/or which device should be designated as a protocol independent multicast (PIM) designated router (DR) that may pull traffic from a core network. In some embodiments, a router may serve as an EVPN provider edge (PE) router as well as a PIM router.

In an embodiment, a device may include an interface in communication with a network. The device may determine whether an all-active multi-homed ethernet segment (ES) associated with the interface is enabled. On a condition that an all-active multi-homed ES is enabled, the device may determine an ethernet virtual private network (EVPN) designated forwarder (DF) state of the all-active multi-homed ES. If the all-active multi-homed ES is enabled and has an ethernet virtual private network (EVPN) designated forwarder (DF) state, the device may enter a protocol independent multicast (PIM) designated router (DR) state. If an all-active multi-homed ES is enabled and does not have an EVPN DF state, the device may enter a PIM non-DR state.

It will be appreciated that, while certain embodiments are disclosed in the context of EVPN all-active multi-homing, the disclosed subject matter is not limited to such embodiments. For example, the disclosed subject matter may be applicable to other embodiments in which an all-active multi-homed ES is in use.

Example Embodiments

FIG. 1 illustrates an example long term evolution (LTE) network 100. The LTE network 100 may include a user equipment (UE) device 102, such as a mobile telephone. It will be appreciated that the LTE network 100 typically includes multiple UE devices 102; however, one UE device 102 is depicted for purposes of simplicity.

The LTE network 100 may include an access network, e.g., an evolved universal mobile telecommunications system (UMTS) terrestrial radio access network (E-UTRAN) 104. The UE device 102 may communicate with the E-UTRAN 104 via a Uu interface. The E-UTRAN 104 may include one or more E-UTRAN Node B, also known as evolved node B (e.g., eNodeB or eNB), entities 106. The E-UTRAN 104 may include one or more next generation NodeB (gNB) entities 108. The one or more gNB entities 108 may be in communication with the one or more eNB entities 106 via one or more X2 interfaces.

The LTE network 100 may include a core network, e.g., an evolved packet core (EPC) network 110. The E-UTRAN 104 may communicate with the EPC network 110 using an S1 interface, which may include an S1-MME interface and/or an S1-U interface. The EPC network 110 may include one or more mobility management entities (MMEs) 112, 114. The one or more MMEs 112, 114 may communicate with the E-UTRAN 104 via an S1-MME interface and may communicate with one another via an S10 interface. The one or more MMEs 112, 114 may control high-level operation of the LTE network 100 using signaling messages and a home subscriber server (HSS) 116, with which they may communicate via an S6a interface. The HSS 116 may serve as a central database that may include information regarding the network operator's subscribers.

The EPC network 110 may also include a packet data network (PDN) gateway (PGW) 118. The PGW 118 may communicate with external resources, e.g., servers and/or packet data networks, via the SGi interface. A serving gateway (SGW) 120 may communicate with the MMEs 112, 114 using an S11 interface and with the E-UTRAN 104 using the S1-U interface. The SGW 120 may forward data between a base station and the PGW 118. The SGW 120 and the PGW 118 may communicate with one another via an S5/S8 interface.

When the UE device 102 establishes a connection with the LTE network 100, an eNB entity 106 may select an MME, e.g., the MME 112 or the MME 114, with which the UE device 102 may register. If the UE device 102 has fifth generation (5G) capability, it may publish its 5G capability in non-access stratum (NAS) messaging. AN MME that has 5G non-standalone architecture (NSA) capability may extract the UE device capability information from the NAS messaging and may receive 5G subscription information for the subscriber from the HSS 116. A 5G capable MME may assist in establishing 5G sessions in the LTE network 100.

Ethernet virtual private networks (EVPNs) may provide ethernet multipoint services over multiprotocol label switching (MPLS) networks. An EVPN may use an EVPN instance (EVI), which may represent a VPN on a provider edge (PE) router. An EVI may serve a role similar to an internet protocol (IP) VPN routing and forwarding (VRF). An EVI may be assigned an import and/or export route target (RT). Depending on the service multiplexing behaviors at a user to network interface (UNI), traffic on a port (e.g., all-to-one bundling), or traffic on a virtual local area network (VLAN) (e.g., one-to-one mapping), or traffic on a list or range of VLANs (e.g., selective bundling) may be mapped to a bridge domain (BD). The BD may be associated with an EVI for forwarding toward a MPLS core.

An EVPN may use ethernet segments (ESs) to represent site connections. ESs may be associated with access-facing interfaces (e.g., physical or logical (ethernet bundles)) that ESs may represent. ESs may be assigned an identifier, e.g., a unique identifier, known as an ethernet segment identifier (ESI). A site may be connected to one or more PEs that may be attached to a common MPLS core to provide access redundancy. PE geo-redundancy and multi-homing (e.g., beyond dual-homing) requirements may be supported. A site may be used to connect to a single device or to an access network. A device may be implemented as a single-homed device (SHD) or a multi-homed device (MHD). A network may be implemented as a single-homed network (SHN) or a multi-homed network (MHN).

An MHD operating as an access device may operate in an all-active load balancing mode, also known as all-active multi-homing. This mode may be defined by an EVPN and/or by a provider backbone bridging EVPN (PBB-EVPN). The MHD may connect via a single ethernet bundle to multiple PEs. The MEM may send and/or receive traffic of the same VLAN from all of the PEs in the same ethernet segment.

An MEM operating as an access device may operate in a single-active load balancing mode. This mode may be defined by an EVPN and/or by a PBB-EVPN. The MEM may connect via separate ethernet bundles to multiple PEs. PE routers may perform service carving to divide VLAN forwarding responsibilities across PEs in the ethernet segment. The MHD may learn via the data plane which ethernet bundle to use for a given VLAN.

EVPN multi-homing is gaining wider acceptance in service provider and data center deployments. EVPN technologies may support all-active multi-homing. Internet group management protocol (IGMP) proxy procedures may be incorporated on EVPN PEs to efficiently support endpoints running IGMP for providing services over an EVPN network.

In some embodiments, an EVPN may not have a capability to act on a presence of a protocol independent multicast (PIM) router in a network. A PIM router may not have a capability to act on a presence of an EVPN in the network. Accordingly, an EVPN network may exhibit dual designated router (DR) behavior as a default behavior. For example, multiple PIM routers in a network may act as a PIM DR.

Some customers may have a high amount of multicast traffic flowing in the network. Such customers may not want to pull duplicate traffic over the core network. The traffic may be dropped at a last hop router (LHR). Some customers may require a single PIM DR solution, e.g., a network that has only one designated router, and they may also be interested in realizing the benefit provided by an EVPN multi-homing segment.

Figure 2:
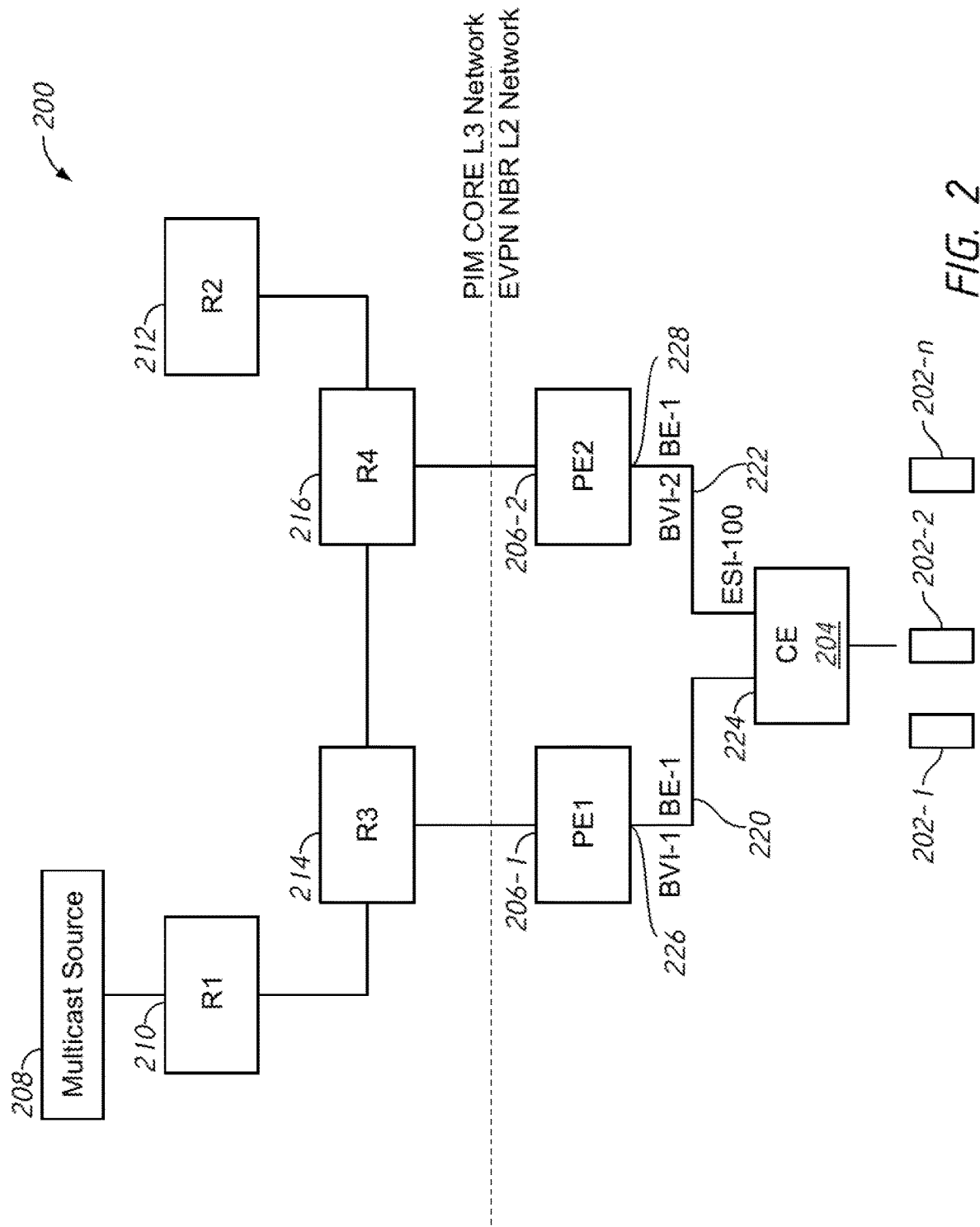
FIG. 2 is a diagram that illustrates an example network.

FIG. 2 illustrates an example network 200. The network 200 may include one or more multicast receivers 202-1, . . . , 202-*n* (collectively referred to as multicast receivers 202) behind a customer edge (CE) device 204, such as a host device, router, or switch. The CE device 204 may be multi-homed to provider edge (PE) routers 206-1 and 206-2. While FIG. 2 illustrates the CE device 204 multi-homed to two PE routers 206-1 and 206-2, it will be appreciated that the CE device 204 may be multi-homed to more than two PE routers. Multi-homing may operate in an all-active mode. The PE routers 206-1 and 206-2 may be EVPN neighbors. EVPN may be used in the access network (e.g., only in the access network). Multiple services may be provided in a core network by PIM. PIM may be used as an underlay protocol for multicast traffic from a multicast source 208 to the multicast receivers 202.

The network 200 may include PE routers 210 and 212, which may be implemented as PIM routers. The network 200 may include provider (P) routers 214 and 216, which may be located in the core network. The P routers 214 and 216 may serve as transit routers of the core network and may be connected to the PE routers 210 and 212. The multicast source 208 may be located behind the PE router 210.

At startup, the PE routers 206-1 and 206-2 may exchange EVPN routes to advertise redundancy group membership. PE routers that are connected to the same ethernet segment (e.g., multi-homed PE routers) may automatically discover each other and elect a designated forwarder (DF) that is responsible for forwarding broadcast, unknown unicast, and multicast (BUM) traffic for a given EVPN instance (EVI). The PE routers 206-1 and 206-2 may see each other as members of a redundancy group on an ethernet segment (ES) 218, which may have an ESI, e.g., ESI-100. The PE routers 206-1 and 206-2 may perform a DF election procedure. For example, the PE router 206-2 may be elected as an EVPN designated forwarder. Accordingly, the PE router 206-2 may have responsibility for forwarding BUM traffic to an access network toward the CE device 204.

An IGMP membership request from the CE device 204 may be received by the PE router 206-1 or the PE router 206-2, for example, depending on a hashing algorithm. A membership state may be synchronized between the multi-homed PE routers 206-1 and 206-2, which may be in the same EVPN redundancy group. An IGMP proxy draft, available at https://tools.ietf.org/html/draft-ietf-bess-evpn-igmp-mld-proxy-01, discloses EVPN routes that may be used to synchronize the state of IGMP snooping between the PE routers 206-1 and 206-2. When the multicast receivers 202 send a membership request (e.g., an (S, G) join request), if the CE device 204 hashed the membership request to the PE router 206-1, the PE router 206-1 may learn about the membership request via IGMP snooping. The PE router 206-1 may create an IGMP snooping state for (S, G). The PE router 206-1 may notify an interface 220 (which may have an identifier, e.g., BVI-1) about the membership request for layer 3 (L3) multicast processing. The PE router 206-1 may synchronize the state using an EVPN multicast join route to the PE router 206-2. On the PE router 206-2, IGMP snooping may create a snooping state for a remote route (S, G) and may notify an interface 222 (which may have an identifier, e.g., BVI-2) for L3 multicast routing processing.

The PE routers 206-1 and 206-2 may be connected to the CE device 204 via a layer 2 (L2) port 224 on the CE device 204 and L2 ports 226 and 228 (which may be identified by an identifier, e.g., Bundle-1 or BE-1) on the PE routers 206-1 and 206-2, respectively. A bridge group virtual interface (BVI), which may also be known as an IRB, may provide connectivity between an L2 network and an L3 network. A BVI is a routed interface that may represent a set of interfaces that may be bridged. In the topology of the network 200, the interfaces 220 and 222 may be interfaces on the PE routers 206-1 and 206-2, respectively.

When multicast routing is enabled on the PE router 206-1 (e.g., on the interface 220) and on the PE router 206-2 (e.g., on the interface 222), the PE routers 206-1 and 206-2 may send PIM messages (e.g., PIM hello messages) on a bridge domain (BD). If the PE routers 206-1 and 206-2 were connected to each other via a shared LAN, the PE routers 206-1 and 206-2 would be able to see each other as PIM neighbors. If the PE routers 206-1 and 206-2 were connected to each other via a shared LAN, the PE routers 206-1 and 206-2 would have been able to perform designated router (DR) election to select which PE router would be responsible for sending a PIM join request upstream. The PE routers 206-1 and 206-2 may be connected via a multichassis link aggregation (MC-LAG) interface. The CE device 204 may not forward a PIM hello message from the PE router 206-1 to the PE router 206-2 or from the PE router 206-2 to the PE router 206-1.

A PIM DR election procedure or algorithm may include one or more processes that may be exemplified by the following pseudocode:

```
host
DR(I) {
    dr = me
    for each neighbor on interface I {
        if ( dr_is_better( neighbor, dr, I ) == TRUE ) {
            dr = neighbor
        }
    }
    return dr
}
```

For example, the designated router for an interface I, DR(I), may be defined by setting a router as a preliminary candidate for the DR and comparing the router with one or more neighboring routers. One or more neighbors (e.g., each neighboring router) on the interface I may be considered to determine whether that neighbor is a better DR candidate than the current (e.g., preliminary) DR candidate. If so, that neighbor may be selected as a new (e.g., current) DR candidate. Accordingly, when all of the neighbors on the interface I have been considered, the best DR candidate may be selected as the DR(I).

The interfaces 220 and 222 may not see each other as PIM neighbors. The PE routers 206-1 and 206-2 may each run this algorithm and may consider themselves as the PIM DR individually. This may cause dual DR behavior in the ES 218, which may be a multi-homed ES.

As disclosed herein, a membership request (e.g., an (S, G) join request) may be sent to the interfaces 220 and 222. Each associated router, e.g., each of the PE routers 206-1 and 206-2, may consider itself to be a DR. Accordingly, both PE routers 206-1 and 206-2 may send PIM join (S, G) requests upstream and may pull traffic.

In some embodiments, an EVPN designated forwarder (DF) may block traffic on one of the interfaces 220 and 222 to avoid duplicate traffic flow toward a receiver. For example, both of the PE routers 206-1 and 206-2 may pull the multicast traffic from the core. An EVPN DF may block traffic on the interface 220, for example, so that the PE router 206-1 may keep dropping the multicast traffic. The PE router 206-2 may forward the multicast traffic to the access network.

Figure 3:
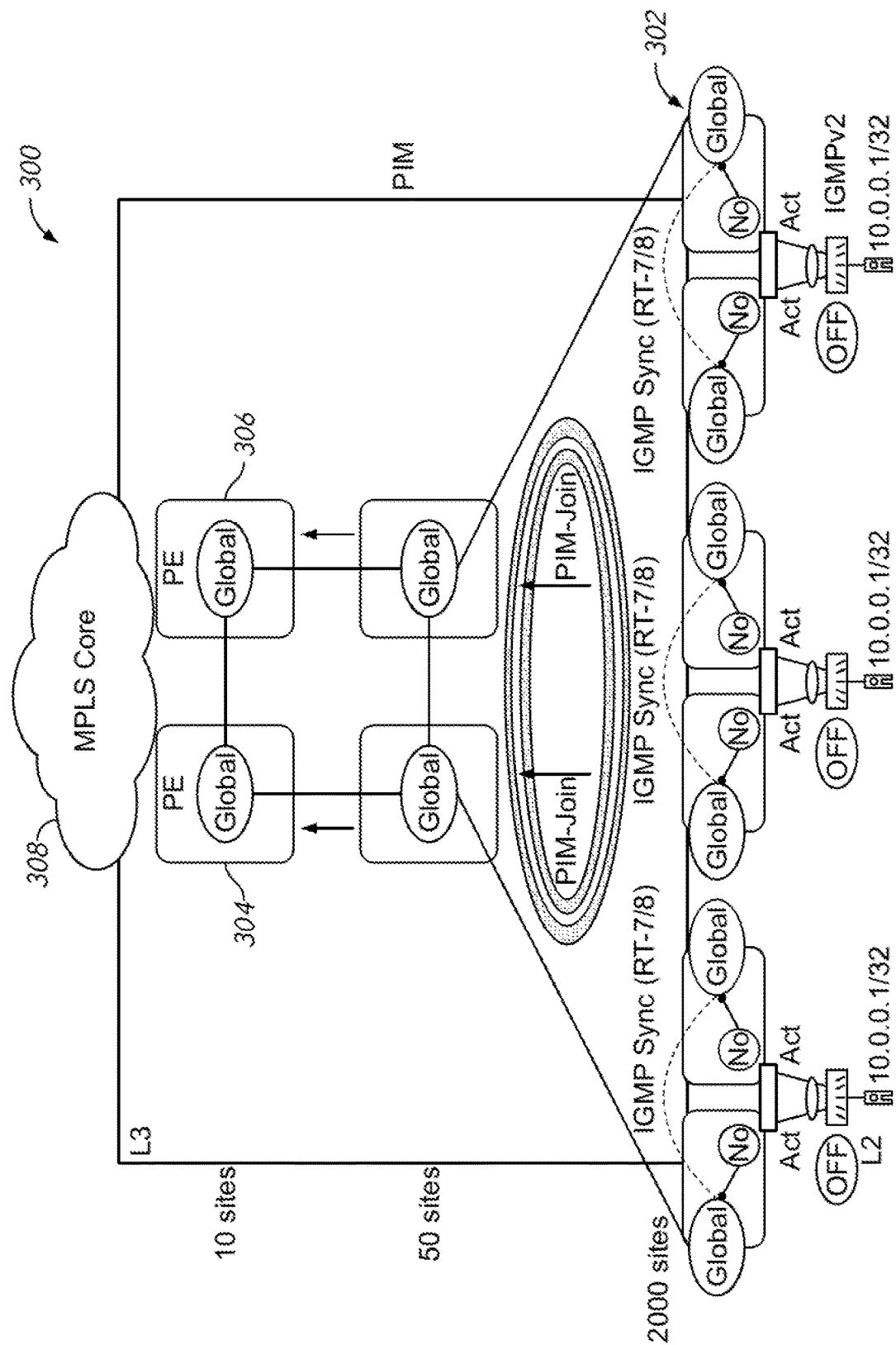
FIG. 3 is a diagram that illustrates an example network.

FIG. 3 illustrates a topology of an example network 300. The network 300 may operate in an all-active load balancing mode, also known as all-active multi-homing. This mode may be defined by an EVPN and/or by a provider backbone bridging EVPN (PBB-EVPN). The topology may be the same or similar for other example service provider networks.

In the network 300, all-active multi-homing may be enabled for, e.g., 2000 sites 302. Skilled persons will appreciate that more or fewer sites 302 may have all-active multi-homing enabled. The number of sites 302 may depend, for example, on the size of the service provider and/or the network design.

In the network topology, PE routers 304 and 306 may exhibit dual DR behavior as disclosed herein. This behavior may cause one or more peers, e.g., peers toward an access circuit (AC), to pull traffic from an MPLS core 308. Traffic may be dropped close to the sites 302, e.g., at the last mile. In a service provider deployment, customers may have different requirements. For example, if multicast service is time sensitive, a customer may not want any downtime and may elect a solution that may have multiple copies of traffic in the MPLS core 308. Some customers, who may have high volumes of multicast flowing and who may be interested in optimal forwarding, may wish to avoid duplication in flows to the extent possible or practicable.

In some embodiments, a designated router (DR) may be elected using a PIM DR election procedure. The PIM DR election procedure may be applicable to an IRB interface in the context of layer 2. The PIM DR election procedure may be applicable to a layer 3 interface in which EVPN may be enabled.

An EVPN designated forwarder (DF) may decide which EVPN in a redundancy group should forward multicast traffic to access circuits (ACs). A PIM DR may determine a PIM router (e.g., which PIM router of a plurality of PIM routers) should pull traffic from a core network. In deployments, a router may act as an EVPN PE router and/or a PIM router. In some embodiments, a PIM router may be aware of an EVPN all-active multi-homing presence. The PIM router may decide on a DR role, e.g., whether to assume the role of DR.

FIG. 4 is a diagram illustrating example pseudocode 400 that may implement one or more embodiments of the disclosed subject matter. A PE router may execute the PIM DR election procedure to select a designated router for an interface I. At 402, in a default case, e.g., in which there is no multi-homing enabled, a designated router DR(I) may be selected. At 404, the designated router DR(I) may be defined by setting a router as a preliminary candidate for the DR and comparing the router with one or more neighboring routers. One or more neighbors (e.g., each neighboring router) on the interface I may be considered to determine whether that neighbor is a better DR candidate than the current (e.g., preliminary) DR candidate. If so, that neighbor may be selected as a new (e.g., current) DR candidate. Accordingly, when all of the neighbors on the interface I have been considered, the best DR candidate may be selected as the DR(I) at 404.

At 406, if the interface I has an all-active multi-homed segment enabled, the presence of a router may be determined by looking at a query and/or PIM message (e.g., PIM hello message) on the network. An orphan bridge port may be a port in a bridge domain on which a local active receiver may be present. At 408, if another PIM router is present or if an orphan bridge port is present, e.g., as indicated by a membership request or query, a designated router DR(I) may be selected as defined at 404. At 410, if the interface I has only a multi-homed segment and at least one ethernet segment (ES) has an EVPN designated forwarder (DF) state, a current router may be selected to assume the role of DR. At 412, in other cases, no DR may be elected on the interface I. The interface I may be in a non-DR state.

Figure 5:
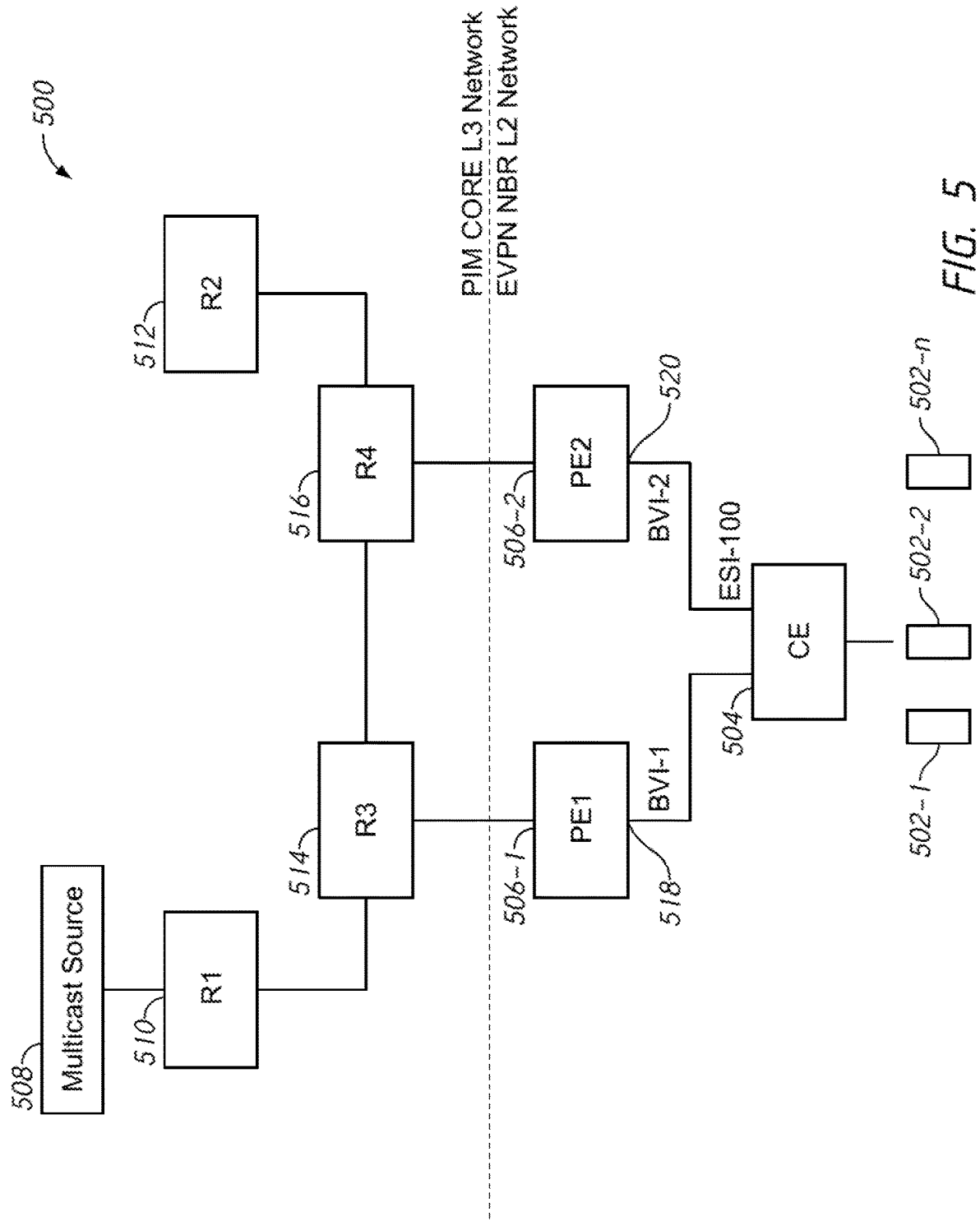
FIG. 5 is a diagram that illustrates an example network.
Figure 6:
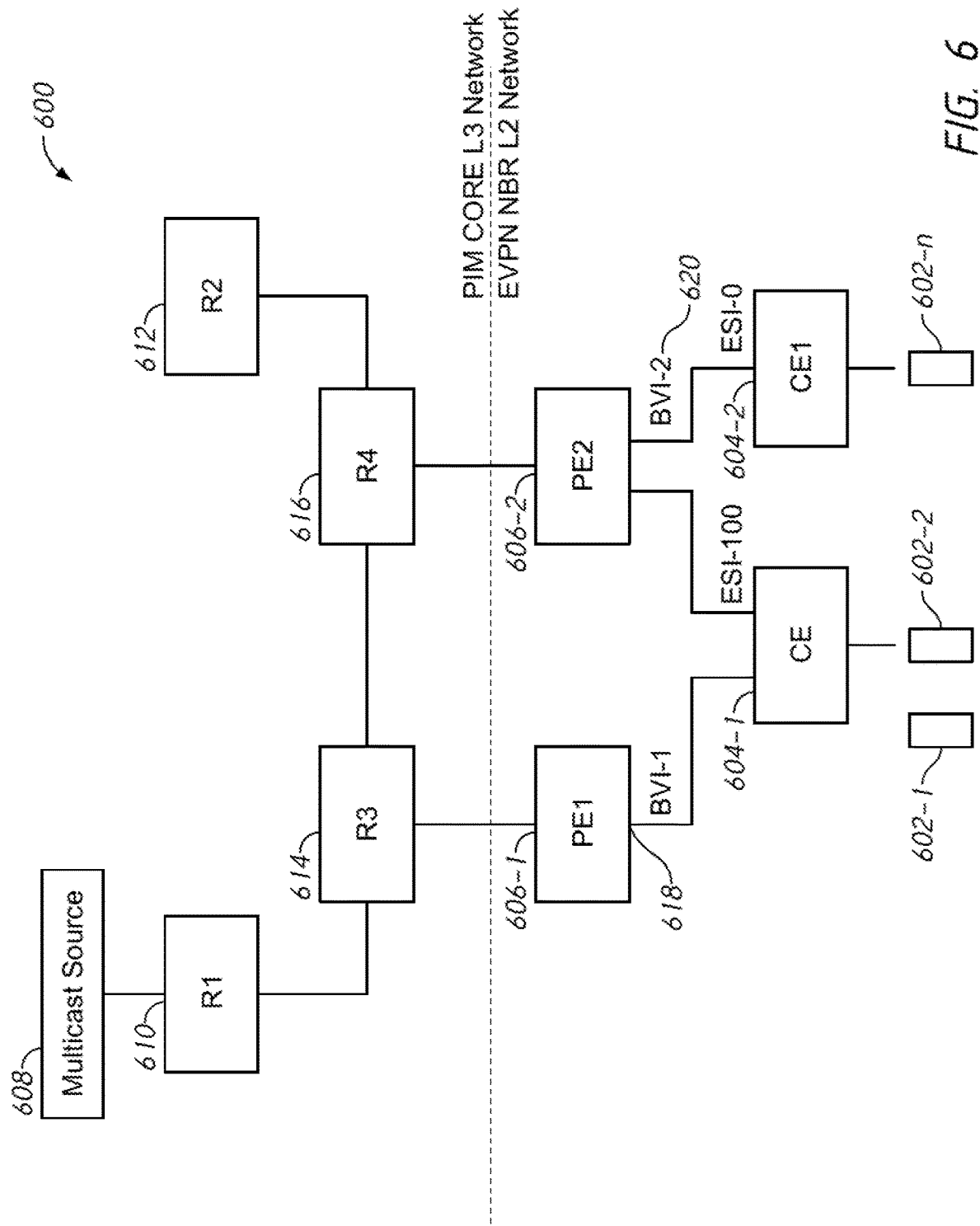
FIG. 6 is a diagram that illustrates an example network.
Figure 7:
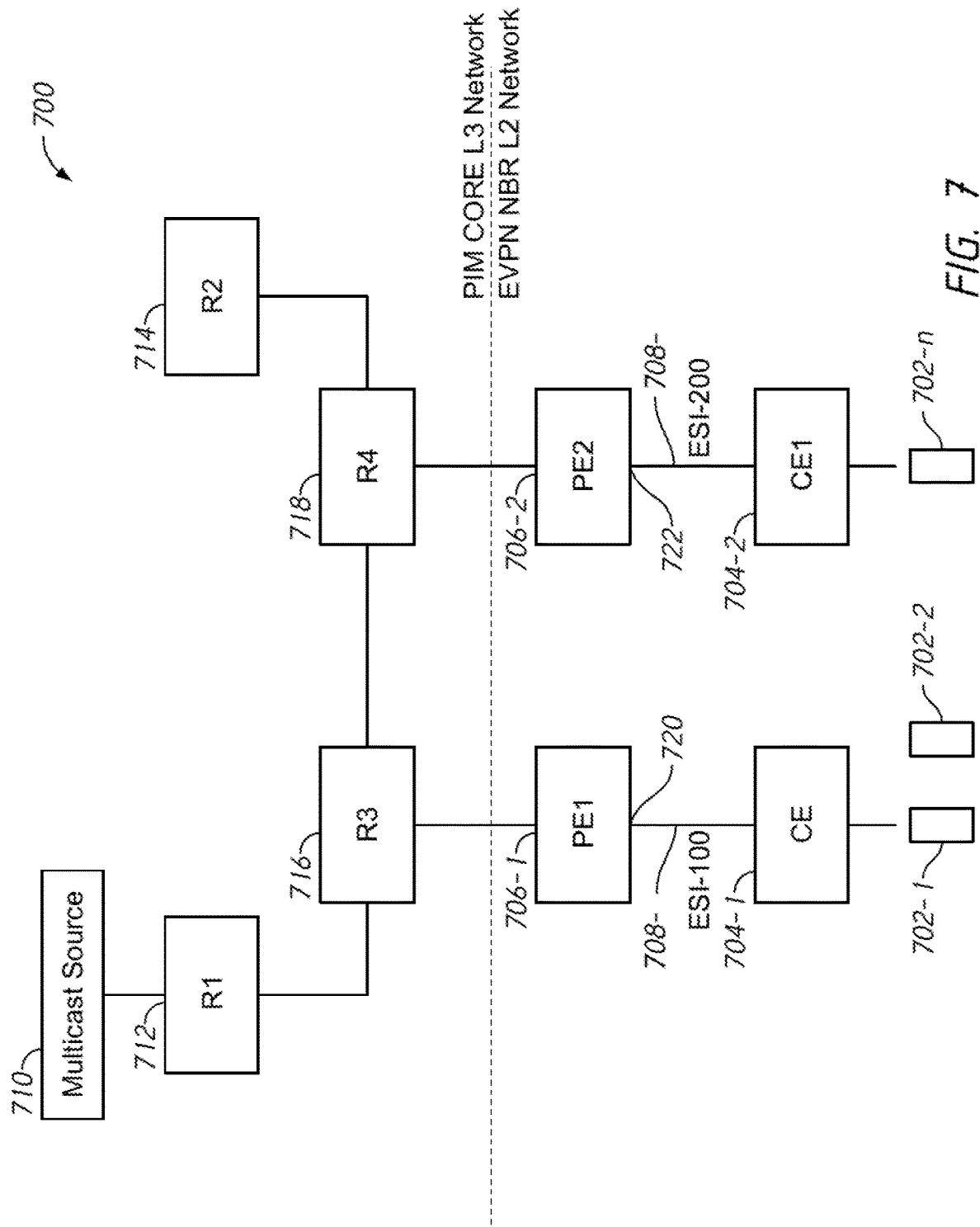
FIG. 7 is a diagram that illustrates an example network.

FIGS. 5-7 illustrate example scenarios in which the disclosed subject matter may be applied to diverse network configurations.

FIG. 5 illustrates an example network 500. The network 500 may include one or more multicast receivers 502-1, . . . , 502-n (collectively referred to as multicast receivers 502) behind a customer edge (CE) device 504, such as a host device, router, or switch. The CE device 504 may be multi-homed to provider edge (PE) routers 506-1 and 506-2. Multi-homing may operate in an all-active mode. The PE routers 506-1 and 506-2 may be EVPN neighbors. EVPN may be used in the access network (e.g., only in the access network). Multiple services may be provided in a core network by PIM. PIM may be used as an underlay protocol for multicast traffic from a multicast source 508 to the multicast receivers 502.

The network 500 may include PE routers 510 and 512, which may be implemented as PIM routers. The network 500 may include provider (P) routers 514 and 516, which may be located in the core network. The P routers 514 and 516 may serve as transit routers of the core network and may be connected to the PE routers 510 and 512. The multicast source 508 may be located behind the PE router 510.

In the network 500, the PE router 506-1 may act as an EVPN designated forwarder (DF). The PE router 506-1 may perform a PIM DR election on an interface 518 (which may have an identifier, e.g., BVI-1). The interface 518 may have only a multi-home segment configured. Accordingly, the interface 518 may check the status of the EVPN DF on the multi-home segment. If the PE router 506-1 is acting as the DF, the interface 518 may be marked (e.g., may mark itself) as the PIM DR.

The PE router 506-2 may perform a PIM DR election on an interface 520 (which may have an identifier, e.g., BVI-2). The interface 520 may have only a multi-home segment configured. The configured multi-home segment may not be in an EVPN DF state. Accordingly, the interface 520 may go to a PIM non-DR state.

The network 500 may be configured to address failure scenarios. For example, if an access circuit (AC), e.g., a segment between the PE router 506-1 and the customer edge device 504, fails, there may be a DF state change from the PE router 506-1 to the PE router 506-2. The PE router 506-2 may be selected as the DF. When the PE router 506-2 enters the DF state, the PE router 506-2 may begin to act as the PIM DR.

As another example, if a core link fails, with all EVPN deployment, the access circuit may also fail. A PIM DR state change may occur. As another example, if a BGP session flaps, one or more peers (e.g., each peer) may act as the DF. PE routers acting as DFs may also enter a PIM DR state. IGMP membership requests may be made to the PE routers 506-1 and 506-2. Multicast traffic may be forwarded from the PE routers 506-1 and 506-2 to the CE device 504.

FIG. 6 illustrates an example network 600. The network 600 may include one or more multicast receivers 602-1, . . . , 602-n (collectively referred to as multicast receivers 602) behind customer edge (CE) devices 604-1 and 604-2. The CE devices 604-1 and 604-2 may be implemented, for example, as host devices, routers, or switches. The CE devices 604-1 and 604-2 may be multi-homed to provider edge (PE) routers 606-1 and 606-2. Multi-homing may operate in an all-active mode. The PE routers 606-1 and 606-2 may be EVPN neighbors. EVPN may be used in the access network (e.g., only in the access network). Multiple services may be provided in a core network by PIM. PIM may be used as an underlay protocol for multicast traffic from a multicast source 608 to the multicast receivers 602.

The network 600 may include PE routers 610 and 612, which may be implemented as PIM routers. The network 600 may include provider (P) routers 614 and 616, which may be located in the core network. The P routers 614 and 616 may serve as transit routers of the core network and may be connected to the PE routers 610 and 612. The multicast source 608 may be located behind the PE router 610.

In the network 600, the PE router 606-1 may act as an EVPN designated forwarder (DF). The PE router 606-1 may perform a PIM DR election on an interface 618 (which may have an identifier, e.g., BVI-1). The interface 618 may have only a multi-home segment configured. Accordingly, the interface 618 may check the status of the EVPN DF on the multi-home segment. If the PE router 606-1 is acting as the DF, the interface 618 may be marked (e.g., may mark itself) as the PIM DR.

The PE router 606-2 may perform a PIM DR election on an interface 620 (which may have an identifier, e.g., BVI-2). The interface 620 may be an orphan port (e.g., an orphan bridge port). An orphan bridge port may be a port in a bridge domain on which a local active receiver may be present. If the orphan port has one or more active multicast receivers, then the interface 620 on the PE router 606-2 may be elected as a PIM DR. If the orphan port has no active receivers, the interface 620 may check if the PE router 606-2 is an EVPN DF on a multi-homed segment. Because the PE router 606-1 (e.g., and not the PE router 606-2) is the EVPN DF, the PE router 606-2 may go to a PIM non-DR state.

The network 600 may be configured to address failure scenarios. For example, if an access circuit (AC), e.g., a segment between the PE router 606-1 and the customer edge device 604-1, fails, there may be a DF state change from the PE router 606-1 to the PE router 606-2. The PE router 606-2 may be selected as the DF. When the PE router 606-2 enters the DF state, the PE router 606-2 may begin to act as the PIM DR.

As another example, if a core link fails, with an all EVPN deployment, the access circuit may also fail. A PIM DR state change may occur. As another example, if a BGP session fails, one or more peers (e.g., each peer) may act as the DF. PE routers acting as DFs may also enter a PIM DR state. IGMP membership requests may be made to the PE routers 606-1 and 606-2. Multicast traffic may be forwarded from the PE routers 606-1 and 606-2 to the CE device 604-1 or the CE device 604-2.

As another example, if one or more active receivers flap on an orphan port, a PIM DR state change may have no impact on other multicast flows. The PE router 606-1 may be the PIM DR and the EVPN DF on a multi-homed segment. A PIM DR state change on the PE router 606-2 may have only a localized impact on the orphan port, e.g., the interface 620. If an active receiver state changes on the interface 620, it may be acceptable for the PIM DR state on the PE router 606-2 to change as well.

FIG. 7 illustrates an example network 700. The network 700 may include one or more multicast receivers 702-1, . . . , 702-*n* (collectively referred to as multicast receivers 702) behind customer edge (CE) devices 704-1 and 704-2 (collectively referred to as CE devices 704). The CE devices 704 may be implemented, for example, as host devices, routers, or switches. In the network topology depicted in FIG. 7, the CE devices 704-1 and 704-2 may be implemented as different devices, and each CE device 704 may be multi-homed to a pair of provider edge (PE) routers 706-1 and 706-2. Multi-homing may operate in an all-active mode.

Ethernet segments (ESs) 708-1 and 708-2 may represent site connections between the CE devices 704 and the PE routers 706-1 and 706-2. The ESs 708-1 and 708-2 may be associated with access-facing interfaces (e.g., physical or logical (ethernet bundles)) that ESs may represent. Each ES 708-1, 708-2 may be assigned an identifier, e.g., a unique identifier, known as an ethernet segment identifier (ESI). Because the ESs 708-1 and 708-2 are different segments, different ESIs, e.g., ESI-100 and ESI-200, may be assigned to them. Link aggregation (LAG) may be present between the CE devices 704 and the PE routers 706-1 and 706-2.

The PE routers 706-1 and 706-2 may be EVPN neighbors. EVPN may be used in the access network (e.g., only in the access network). Multiple services may be provided in a core network by PIM. PIM may be used as an underlay protocol for multicast traffic from a multicast source 710 to the multicast receivers 702.

The network 700 may include PE routers 712 and 714, which may be implemented as PIM routers. The network 700 may include provider (P) routers 716 and 718, which may be located in the core network. The P routers 716 and 718 may serve as transit routers of the core network and may be connected to the PE routers 712 and 714. The multicast source 710 may be located behind the PE router 712.

In the network 700, the PE router 706-1 or the PE router 706-2 may act as an EVPN designated forwarder (DF) for both ESs 708-1 and 708-2. For example, if the PE router 706-1 is the EVPN DF for both ESs 708-1 and 708-2, the PE router 706-1 may perform a PIM DR election on an interface 720 (which may have an identifier, e.g., BVI-1) and may be marked (e.g., may mark itself) as the PIM DR. An interface 722 (which may have an identifier, e.g., BVI-2) on the PE router 706-2 may enter a PIM non-DR state.

In an embodiment, the EVPN DF may be distributed among the participant PE routers, e.g., the PE routers 706-1 and 706-2. For example, the PE router 706-1 may the EVPN DF for the ES 708-1, and the PE router 706-2 may be the EVPN DF for the ES 708-2. In this scenario, both the PE router 706-1 and the PE router 706-2 may act as a PIM DR.

The network 700 may be configured to address failure scenarios. For example, if an access circuit (AC), e.g., a segment between the PE router 706-1 and the customer edge device 704-1, fails, there may be a DF state change from the PE router 706-1 to the PE router 706-2. The PE router 706-2 may be selected as the DF. When the PE router 706-2 enters the DF state, the PE router 706-2 may begin to act as the PIM DR.

As another example, if a core link fails, with all EVPN deployment, the access circuit may also fail. A PIM DR state change may occur. As another example, if a BGP session flaps, one or more peers (e.g., each peer) may act as the DF. PE routers acting as DFs may also enter a PIM DR state. IGMP membership requests may be made to the PE routers 706-1 and 706-2. Multicast traffic may be forwarded from the PE routers 706-1 and 706-2 to the CE device 704-1 or the CE device 704-2.

Figure 8:
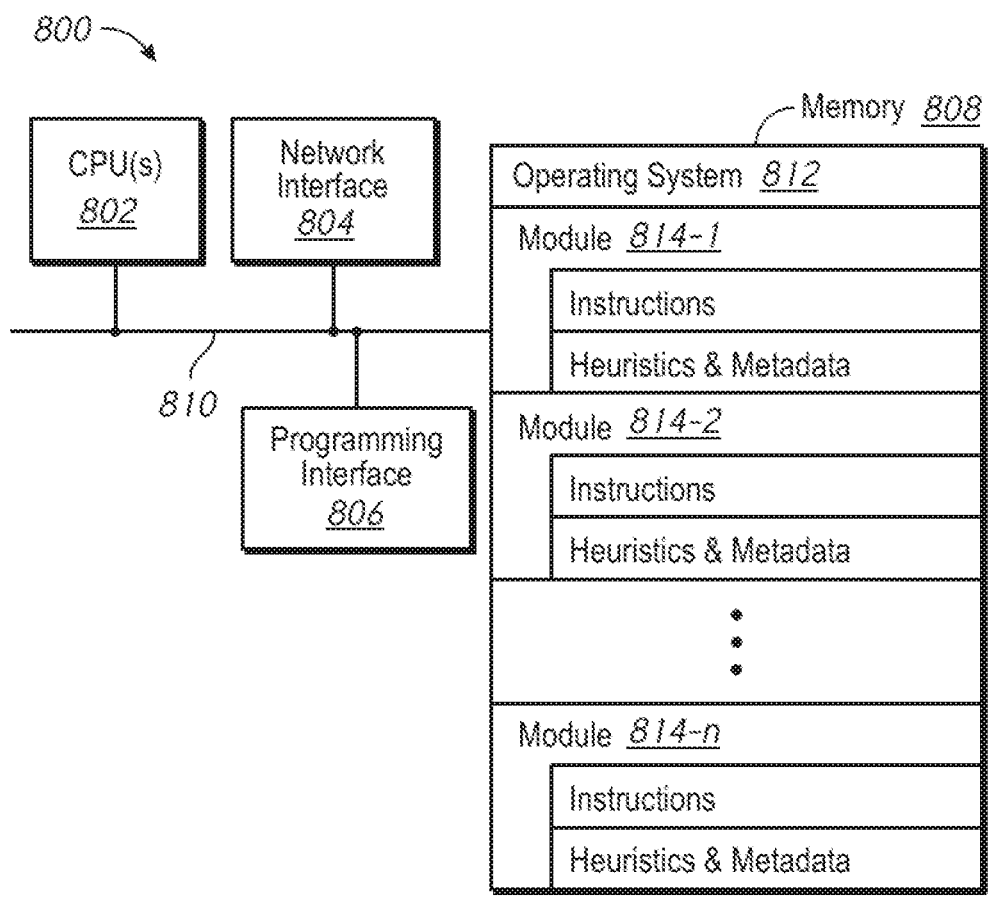
FIG. 8 is a block diagram that illustrates an example server system.

FIG. 8 is a block diagram of an example server system 800 enabled with one or more components of a device, server, or system in accordance with some embodiments. While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the server system 800 may include one or more processing units (CPUs) 802, a network interface 804, a programming interface 806, a memory 808, and one or more communication buses 810 for interconnecting these and various other components.

The network interface 804 may be provided to, among other uses, establish and/or maintain a metadata tunnel between a cloud-hosted network management system and at least one private network including one or more compliant devices. In some embodiments, the one or more communication buses 810 may include circuitry that interconnects and controls communications between system components. The memory 808 may include one or more of high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. The memory 808 may include one or more storage devices remotely located from the one or more CPUs 802. The memory 808 may comprise a non-transitory computer readable storage medium.

In some embodiments, the memory 808 or the non-transitory computer readable storage medium of the memory 808 may include (e.g., store) the following programs, modules, and data structures, or a subset thereof including one or more of an operating system 812 or various modules 814-1, 814-2, . . . , 814-*n*. The modules 814-1, 814-2, . . . , 814-*n*, individually and/or collectively, perform one or more of the operations described herein. To that end, in various embodiments, the modules 814-1, 814-2, . . . , 814-*n* may include respective instructions and/or logic, and heuristics and metadata.

Various aspects of embodiments within the scope of the appended claims are described above. It should be apparent that the various features of embodiments described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   determining, at a device comprising an interface in communication with a network, that an all-active multi-homed ethernet segment (ES) associated with the interface is enabled, wherein the device is multi-homed in an all active mode to a plurality of edge routers of an ES;
   in response to determining that the all-active multi-homed ES is enabled, determining an ethernet virtual private network (EVPN) designated forwarder (DF) state of the all-active multi-homed ES;
   in response to determining that the all-active multi-homed ES is enabled and has the EVPN DF state, entering a protocol independent multicast (PIM) designated router (DR) state; and
   in response to determining that the all-active multi-homed ES is enabled and does not have the EVPN DF state, entering a PIM non-DR state, wherein, in the PIM non-DR state, no DR is elected on the interface.

2. The method of claim 1, further comprising, in response to determining that the all-active multi-homed ES is not enabled, selecting a DR.

3. The method of claim 1, further comprising, in response to determining that the all-active multi-homed ES is enabled and a PIM router is associated with the interface, selecting a DR.

4. The method of claim 3, further comprising determining whether the PIM router is associated with the interface as a function of at least one of a query or a PIM message.

5. The method of claim 1, further comprising, in response to determining that the all-active multi-homed ES is enabled and an orphan bridge port is associated with the interface, selecting a DR.

6. The method of claim 5, further comprising, in response to determining that the orphan bridge port is associated with an active multicast receiver, selecting another device to enter the PIM DR state.

7. The method of claim 5, further comprising, in response to determining that the orphan bridge port is not associated with an active multicast receiver and is not in the EVPN DF state, entering the PIM non-DR state.

8. The method of claim 1, further comprising selecting a DR at least in part by comparing the device with a neighboring device.

9. A device comprising:
   a memory device; and
   a processor connected to the memory device, wherein the processor is operative to:
      determine whether an all-active multi-homed ethernet segment (ES) associated with the interface is enabled, wherein the device is multi-homed in an all active mode to a plurality of edge routers of an ES;
      in response to determining that the all-active multi-homed ES is enabled, determine an ethernet virtual private network (EVPN) designated forwarder (DF) state of the all-active multi-homed ES;
      in response to determining that the all-active multi-homed ES is enabled and comprises the EVPN DF state, enter a protocol independent multicast (PIM) designated router (DR) state; and
      in response to determining that the all-active multi-homed ES is enabled and does not have an EVPN DF state, enter a PIM non-DR state, wherein, in the PIM non-DR state, no DR is elected on the interface.

10. The device of claim 9, wherein in response to determining that the all-active multi-homed ES is not enabled, the processor is operative to select a DR.

11. The device of claim 9, wherein in response to determining that the all-active multi-homed ES is enabled and a PIM router is associated with the interface, the processor is operative to select a DR.

12. The device of claim 11, wherein the processor is further operative to determine that the PIM router is associated with the interface as a function of at least one of a query or a PIM message.

13. The device of claim 9, wherein in response to determining that the all-active multi-homed ES is enabled and an orphan bridge port is associated with the interface, the processor is operative to select a DR.

14. The device of claim 13, wherein in response to determining that the orphan bridge port is associated with an active multicast receiver, the processor is operative to select another device to enter the PIM DR state.

15. The device of claim 13, wherein in response to determining that the orphan bridge port is not associated with an active multicast receiver and is not in the EVPN DF state, the processor is operative to enter the PIM non-DR state.

16. The device of claim 9, wherein the the processor is operative to select a designated router (DR) at least in part by comparing the device with a neighboring device.

17. A non-transitory computer readable storage medium storing instructions, that, when executed by a processor perform a method comprising:
   determining, at a device comprising an interface in communication with a network, that an all-active multi-homed ethernet segment (ES) associated with the interface is enabled, wherein the device is multi-homed in an all active mode to a plurality of edge routers of an ES;
   in response to determining that the all-active multi-homed ES is enabled, determining an ethernet virtual private network (EVPN) designated forwarder (DF) state of the all-active multi-homed ES;

in response to determining that the all-active multi-homed ES is enabled and comprises the EVPN DF state, entering a protocol independent multicast (PIM) designated router (DR) state; and in response to determining that the all-active multi-homed ES is enabled and does not comprises the EVPN DF state, entering a PIM non-DR state, wherein, in the PIM non-DR state, no DR is elected on the interface.

18. The non-transitory computer readable storage medium of claim 17, wherein in response to determining that no all-active multi-homed ES is enabled, selecting a DR.

19. The non-transitory computer readable storage medium of claim 17, wherein in response to determining that an all-active multi-homed ES is enabled and a PIM router is associated with the interface, selecting a DR.

20. The non-transitory computer readable storage medium of claim 17, wherein in response to determining that an all-active multi-homed ES is enabled and an orphan bridge port is associated with the interface, selecting a DR.

* * * * *